Oct. 25, 1927.
J. A. EDEN, JR
1,646,954
MACHINE FOR THREADING OR TURNING BOLT BLANKS OR THE LIKE
Filed Oct. 30, 1923
5 Sheets-Sheet 3
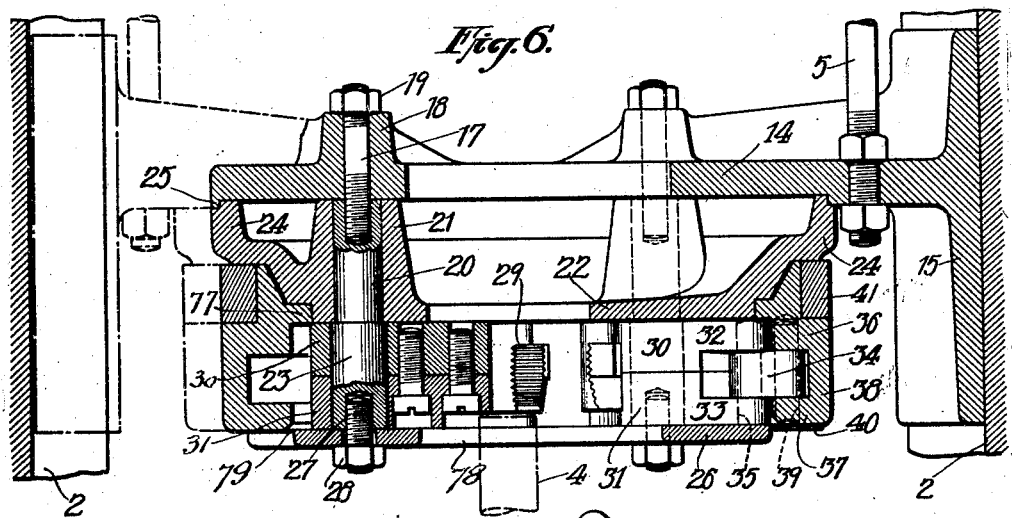
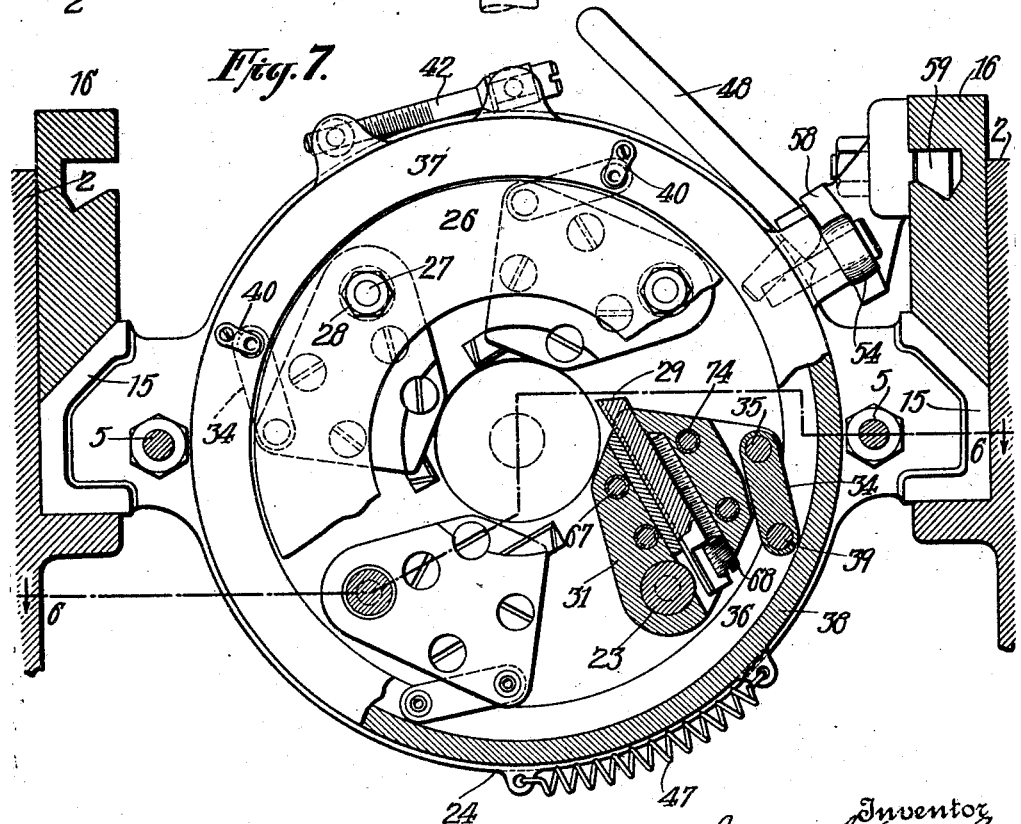

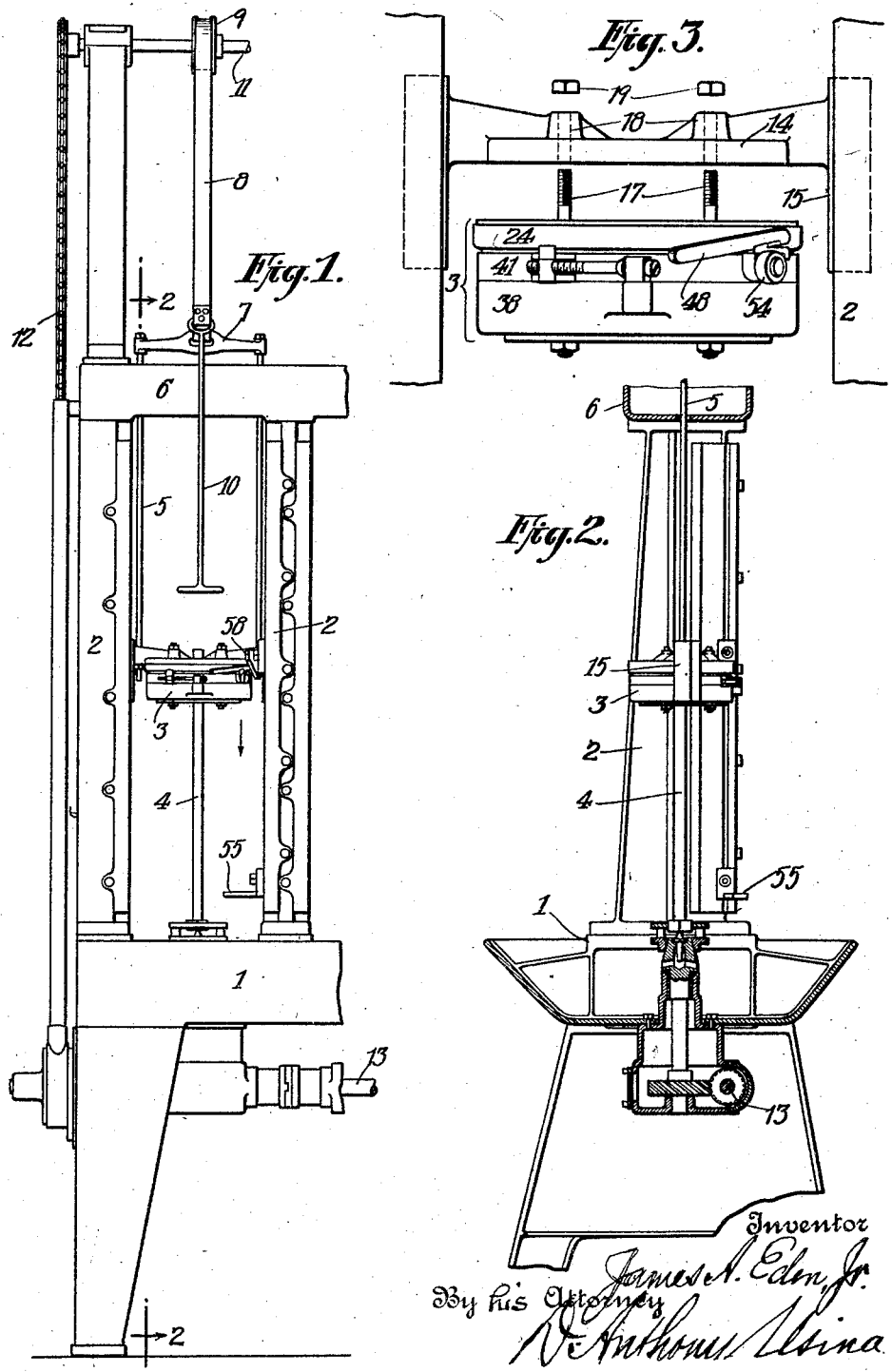

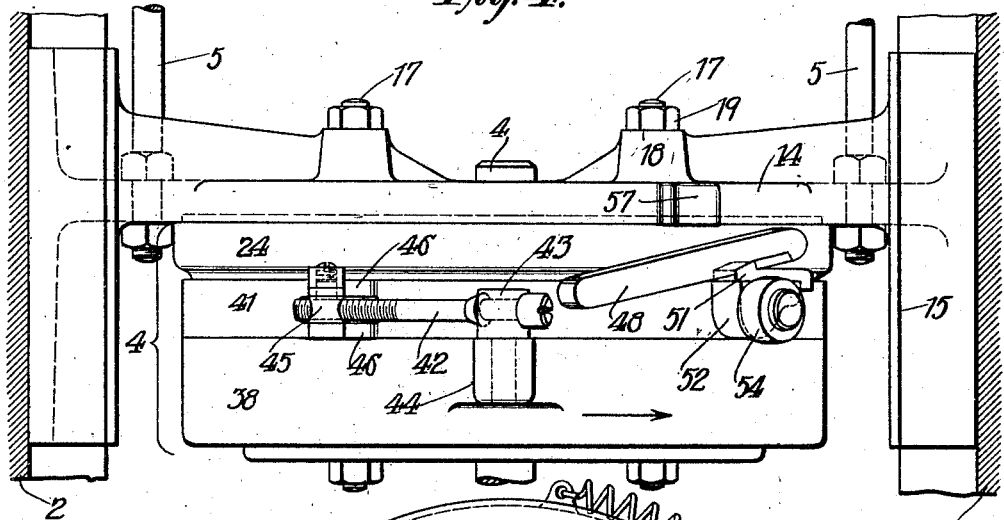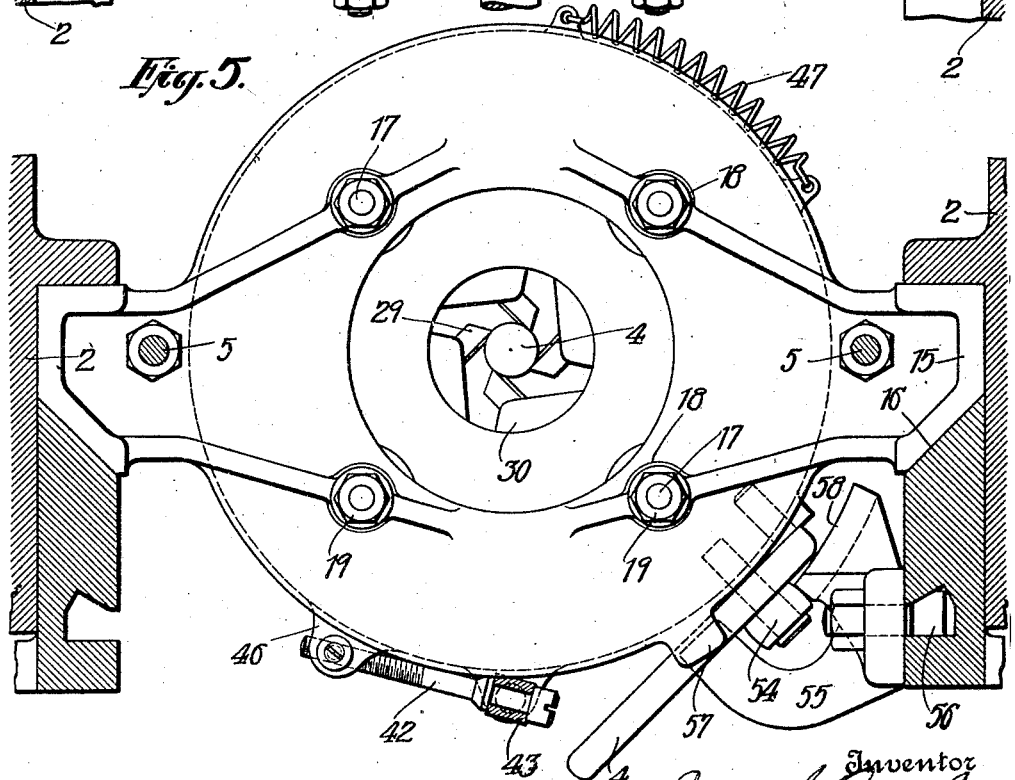

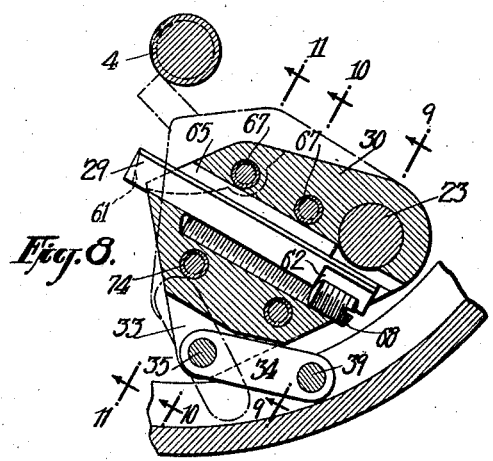

Oct. 25, 1927.
J. A. EDEN, JR
1,646,954
MACHINE FOR THREADING OR TURNING BOLT BLANKS OR THE LIKE
Filed Oct. 30, 1923     5 Sheets-Sheet 5
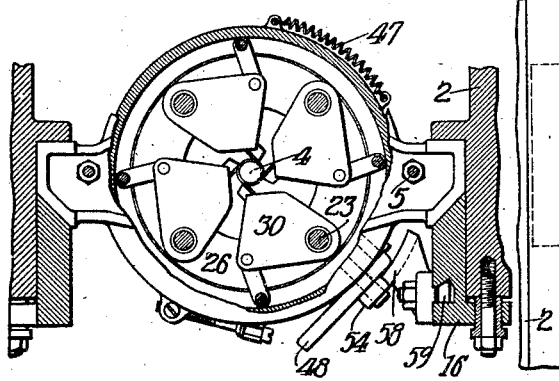
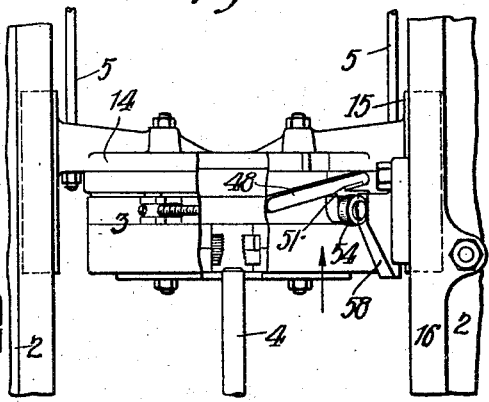
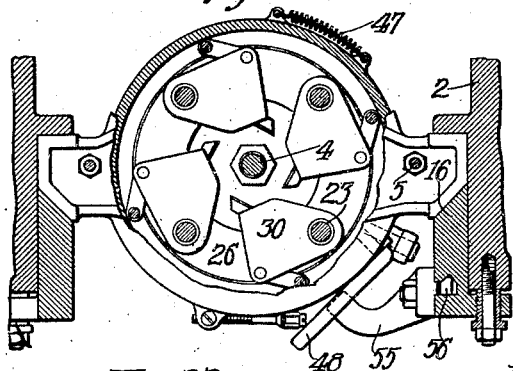
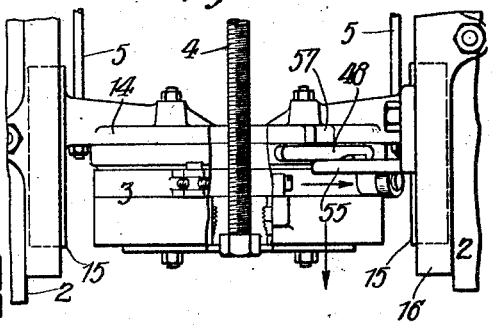
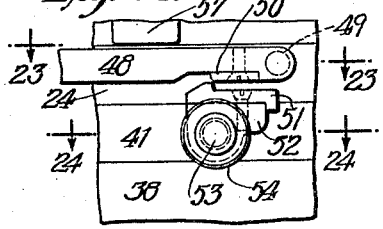
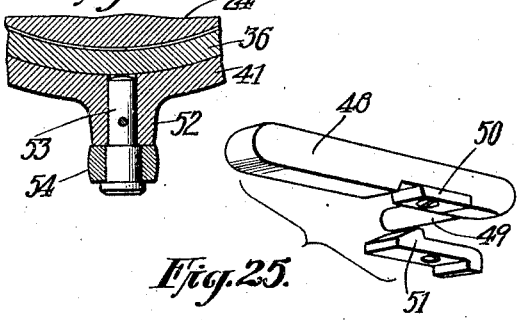
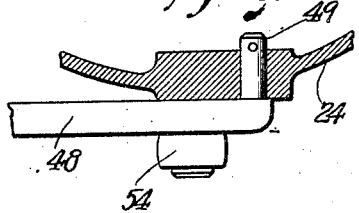
Inventor
James A. Eden, Jr.
By his Attorney Patented Oct. 25, 1927.

1,646,954

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

MACHINE FOR THREADING OR TURNING BOLT BLANKS OR THE LIKE.

Application filed October 30, 1923. Serial No. 671,653.

In a previous Patent No. 1,367,951 of February 8, 1921 I have described a machine designed particularly, though not exclusively, for threading stay-bolts, and particularly a cutter-head for carrying the chasers or the turning cutters of such machines. The present invention is directed to machines of the same class and particularly provides certain improvements in the cutters or chasers and the cutter-head and means for controlling the same.

Fig. 1 is an elevation of a bolt threading machine with my improved cutter-head;

Fig. 2 is a vertical section on the line 2—2 of Fig. 1;

Fig. 3 is an elevation of the cutter head and supporting plate therefor, the cutter-head being detached from its support;

Fig. 4 is a similar view of the cutter-head in position on its support;

Fig. 5 is a plan of the same;

Fig. 6 is a section of the head on the line 6—6 of Fig. 7;

Fig. 7 is an underside plan view of the head partly broken away and sectioned;

Fig. 8 is a horizontal section of one of the cutter holders and connected parts;

Figs. 9, 10 and 11 are vertical sections approximately on the correspondingly numbered lines of Fig. 8;

Fig. 12 is an isometric view of the chaser and a clamping plate therefor;

Fig. 13 is a vertical section through an edge of the adjusting ring of the cutter-head, illustrating the withdrawal of a pivot pin of one of the toggles;

Fig. 14 is an isometric view of one of the toggles and its pivot pins inverted;

Fig. 15 is a view similar to Fig. 8, illustrating an alternative method of fastening the cutter in its holder;

Fig. 16 is a vertical section thereof approximately on the line 16—16 of Fig. 15;

Fig. 17 is a similar section of a slightly different construction;

Figs. 18 and 19 are a plan and front elevation respectively, illustrating the action of the controlling mechanism as a cutter-head rises to the top of its stroke;

Figs. 20 and 21 are similar views illustrating the position of the parts near the end of the downward stroke;

Fig. 22 is a front elevation of a detail of the latch;

Figs. 23 and 24 are horizontal sections on the correspondingly numbered lines of Fig. 22;

Fig. 25 is an isometric view of the two parts of the latch;

Fig. 26 is a detail illustrating the action of the cutter.

Referring to the embodiment of the invention illustrated the machine comprises a base 1 and uprights 2 to any desired number, the space between each pair of uprights being occupied by a cutter-head 3 which is guided thereby for vertical movement on a bolt blank 4. The head of the blank rests in a socket at the bottom which is rapidly rotated by a spindle so that the downward movement of the head 3 will turn the blank or cut a thread thereon. For turning it a forcible downward feed of the head is required. For threading the blank, it is sufficient to bring the chasers into engagement with its upper end. The head will then be drawn down by the engagement of the chasers with the work, assisted by the weight of the head. This is the type of machine illustrated. The head is carried by rods 5 which pass upward through and above the head 6 to a yoke 7 which is suspended from the rear end of a strap 8 which passes up over a pulley 9 and down to a handle 10 within reach of the operator. The pulleys 9, one of them for each unit of the machine, are mounted on a shaft 11, driven by a sprocket chain 12, from a horizontal shaft 13 below the base of the machine; which serves also to drive the spindles which rotate the blanks.

When the operator pulls the handle 10 the strap 8 is frictionally engaged with the pulley 9 and the rotation of the latter lifts the cutter-head to the desired point above the end of the blank. When the operator releases the handle 10 the cutter-head falls to a point where it engages the end of the blank, and the rotation of the blank feeds it downward.

The cutter-head 3 is detachably connected to a supporting plate 14, Fig. 3, which has at its ends vertical extensions 15 sliding in guide ways formed by the gibs 16 which are adjustably secured to the uprights 2 of the machine frame by bolts passing through a bushing threaded in the gib and secured with the upright as shown in Fig. 18. The attachment of the head is effected by means of bolts 17 fixed at the lower ends in suitable parts of the head proper and adapted to pass upward through bosses 19 of the supporting plate 14 and to be fastened by means of nuts 19 engaging their upper ends. See Figs. 4 to 7. By this means the cutter-head can be taken out of the machine completely assembled.

The movable parts within the cutter-head are mounted on certain pins 20 the upper parts of which are fastened by a drive fit in bosses 21 on the top plate 22. The lower parts 23 of the said pins form shoulders engaging the underside of the plate 22, so that when the bolts 17 are drawn up the plate 22 will be brought up with a firm bearing against the underside of the supporting plate 14. The top plate 22 of the head has an upward flange 24 bearing against the underside of the supporting plate 14 and fitting within a rib 25 on the latter. The supporting plate 14 is fastened to the lower ends of the rods 5 by which it and the cutter-head are raised in the manner above described.

The cutters and their holders and connected parts are fastened in place between the top plate 22 and the bottom plate 26 of the head. For this purpose the bolts 27 are mounted in the lower ends of the pins 23 and project through holes in the lower plate 26 and have their projecting ends engaged by nuts 28.

Each of the chasers 29 is mounted in a block formed of upper and lower halves or parts 30 and 31, Figs. 9, 10, and 11, which have projecting ears 32 and 33 embracing the end of a toggle link 34, and a pivot pin 35 extends through the ears referred to and through the end of the toggle link. The pins 35 are held against longitudinal escape, the parts 32 and 33 of the block filling the space between the top and bottom plates of the head as shown at the right in Fig. 6. The outer end of each toggle link 34 lies between flanges 36 and 37 of a ring 38 which surrounds the several blocks for a purpose hereinafter described, and the toggle link carries at its outer end a pin 39 which passes through vertical holes in the said flanges. The hole in the lower flange 37 is open at the bottom for introduction and withdrawal of the pivot pin 39. Preferably, to prevent accidental escape of the pivot pins, plates 40 are pivotally fastened on the underside of the ring 38 to cover the ends of the pivot pins. See Figs. 7 and 13.

The ring 38 has an upward extension surrounding a circular shoulder on the top plate 22 of the head so that the ring can be rocked to operate the toggles and to swing the cutter blocks about the pins 23 as shown in dotted lines in Fig. 8, and to thereby press the chasers into engagement with the work or withdraw them therefrom. On the operating ring 38 there is mounted an adjusting ring 41 arranged to rotate with reference to the operating ring 38. The relation of these two rings to each other is adjusted by means of a screw 42 having its head end held against longitudinal movement but rotatably in a post 43 on the end of a stem which is rotatably carried in a boss 44 of the operating ring 38. The free end of the screw 42 is threaded through a nut 45 carried between lugs 46 projecting from the ring 41, the nut 45 being mounted for rotation about a vertical axis.

A spring 47 at the rear of the head has one end connected to the ring 38 and the other to the flange 24 of the fixed top plate 22 of the head as shown best in Fig. 7, and tends to pull the ring 38 around in a direction to open the cutters. On the front of the machine however there is a latch for holding them closed during an ordinary operation. A latching arm 48, Figs. 4 and 22, is made with an integral pivot pin 49 by which it is pivotally mounted in a boss of the flange 24 of the top plate of the head (Fig. 22). The locking arm 48 has a wear plate 50 forming a shoulder adapted to drop into engagement with the shoulder on a catch 51 which is mounted on the adjusting ring 41; the latter being adjusted in fixed relation with the operating ring 38. The catch 51 is in the form of a plate fastened on to a lug 52 which projects integrally from the side of the ring 41. This lug 52 carries a radially projecting pin 53 on the end of which is mounted a roller 54 extending beyond the arm 48.

The latch 48 normally holds the operating ring 38 in position to hold the chasers in contact with the work. This position continues during the downward travel of the head until, at a determined point generally near the lower end of the blank, the thread is to stop. At this point the projecting end of the lever strikes an arm 55 set at a desired position of adjustment by means of a clamping bolt 56 (Fig. 5) entering an undercut groove in the gib 16 of the upright 2. This contact lifts the arm 48, this upward movement being limited by a boss 57 of the supporting plate, which withdraws the latch and allows the spring to turn the ring 38 in the direction of the arrow in Figs. 4 and 21 to fully open the chasers. The operator then pulls the handle to lift the head as above described.

At the end of the upward movement of the carrier the operating ring 38 is turned in the opposite direction to close the cutters. For this purpose a cam 58 is used, being clamped to the guide way 16 on the upright 2 by means of a bolt having an enlarged head 59 (Fig. 7) fitting in an undercut groove so that the cam can be adjusted in height for blanks of different lengths. The roller 54 striking the cam is pushed around in the closing direction against the pull of the spring, as in Fig. 19. The catch 51 is then caught by the shoulder on the latching lever 48 and the cutters are thus closed to their operating position and held there during the following downward feeding movement. The end of the upward stroke is shown in Figs. 18 and 19 and the end of the downward stroke in Figs. 20 and 21.

The threading cutters are of the shape shown separately at 29, Fig. 12, of approximately rectangular cross-section for the greater part of their length, the face being formed with teeth 60 and the lower portion of the forward edge being tapered at the bottom as at 61. At the rear end the cutter is recessed at the back to provide a shoulder 62. The cutter is held in registering recesses 63 and 64 in the two halves 30 and 31 of the holder and clamped therein by means of a small block or wedge 65 with V-shaped teeth on its face engaging the teeth 60 on the face of the cutter. The wedge 65 is provided with a pair of shoulders 66 on its lower rear edge which are engaged by the heads of screws 67 passing up through recesses in the lower half 31 of the holder, and threaded into openings in the upper half 30. See Fig. 11. The turning of the screws exerts an upward pressure on the wedge 65, and the inclined surfaces of the teeth of the latter exert a wedging action against the faces of the teeth 60 on the chaser 29. By loosening the screws 67 the cutter can be advanced lengthwise to adjust it for wear or to set it accurately at the desired position of adjustment. Lengthwise adjustment of the cutter is effected by means of a screw 68 (Fig. 8) engaging a thread in a corner of the recess in the upper block, as shown at 69, Figs. 9 to 11. This thread extends nearly around the screw but leaves a portion of the latter projecting over the shoulder 62 of the chaser, so that by advancing the screw the chaser is adjusted forward.

The chaser has a number of teeth. But only the lower teeth do the cutting. Those above the horizontal center line serve chiefly to engage the thread already cut and thus to guide and steady the chaser. See Fig. 26. The lowermost teeth are ground off, and the forward edge of the chaser is bevelled as at 70 throughout the height of these teeth and bevelled at the back as at 61 for clearance.

Instead of using a wedge of the type shown at 65, Fig. 11, exerting its wedging action on the bevelled faces of the teeth 60 of the cutter, a wedge may be used of the style shown at 71, Fig. 16. The face of this wedge is flat and bears against the edges of the teeth on the cutter 29, and the back of the wedge is inclined and bears against a suitably located shoulder on the outer part of the block 30. The screws 67 in this case force the wedge against the teeth of the cutter and clamp the latter in place.

Or, as in Fig. 17, a pair of wedges 72 and 73 may be used, located in a recess in the block 30, having inclined faces in engagement with each other, and the block 72 having a flat face bearing against the teeth of the cutter 29. The clamping screw 67 forces the wedge 72 upward and thus presses it against the cutter and clamps the latter. For the long wedge 65 a pair of clamping screws 67 are used, Fig. 8. For the constructions of Figs. 16 and 17 however a single clamping screw 67 is used with a comparatively short wedge (71, Fig. 15, for example). The other screws 74 illustrated are for fastening together the two parts 30 and 31 which constitute the tool holder.

Fig. 14 is an inverted view of a toggle link 34 with the toggle pins 35 and 39 located therein, and shows threaded sockets 75 in the lower ends of the pins for facilitating their removal by means of a rod or handle 76, Fig. 13, which may be screwed into such recesses. This figure illustrates the removal of one of the toggle pins 39 from the underside of the ring 38, the closing plate 40 being first turned back as illustrated.

The portions 23 of the pins serve to space the upper and lower plates of the cutter-head. The cutter-carriers fit between the upper and lower plates with just sufficient clearance for free movement. The turning ring 38 is in a plane substantially coincident with that of the cutter-carriers and the line of pressure from the ring through the toggle links passes through the cutters; the axis or horizontal longitudinal center line of each of the links being approximately in line with the horizontal center line of the chasers and preferably with the teeth which make the finishing cut. By reason of this arrangement the closing pressure of the chasers is in a plane normal to the axis of the work and is applied most efficiently and without bending strains at the pivot points. When the ring is turned to close the cutters at the top of the upward movement of the head, the closing pressure is likewise transmitted in a direction lying in the same plane, and therefore most efficiently. The toggle pins have both their ends projecting beyond the links, so that they are provided with two supporting bearings, one at each end, which is advantageous in avoiding any tendency of the links to tilt vertically and which is the most efficient and durable style of bearing. The bearings for the outer pins are in the flanges 36 and 37 of the turning ring, and the bearings for the inner pins are in the ears 32 and 33 of the two parts of the cutter-carriers.

In the ordinary cutter-carrier the recesses for the cutter and the clamping and adjusting devices weaken the carrier so that it has to be made of generous dimensions to withstand the strains of use. By making it in two separate parts fastened at opposite sides of the tool recess a very stiff and strong structure is obtained and one which for a given strain can be made lighter than the usual one-piece blocks. As shown, in fact, the carrier engages the chaser on all four sides, thus holding it rigidly against lateral movement in any direction, and the carrier is still of such comparatively slight dimensions that it can be enclosed within the head.

The gibs 16 with the T-slots or undercut recesses as shown most clearly in Fig. 5, extending throughout the full travel of the moving parts furnish a very convenient and satisfactory means for mounting detachable controlling devices at various points in the height. They are useful not only in the particular machine illustrated but in various other machines of this class.

In Fig. 6 it will be observed that the upper part 30 of the cutter-carrier extends outwardly in the radial direction sufficiently to overlap the flange 77 of the ring. The purpose of this construction is to hold the parts together in case the lower plate 26 of the head should be removed so as to inspect the inside parts from the bottom or to remove chips or dirt therefrom. When this is done the cutters will be brought to their inner position engaging a thumb bolt, by which the cutters and the blocks will be held up. The holding up of the blocks 30 will prevent any dropping down of the rings. The toggle links will hold the ring against dropping entirely out of place. But it is desirable to have them firmly in their proper position and the flange 77 overlying the upper part 30 of the blocks will effect this purpose.

Referring also to Fig. 6 it will be observed that besides the central opening 78 in the lower plate, through which the work passes, there is an annular opening 79 surrounding the lower plate, the diameter of the latter being made slightly less than that of the lower face of the bottom flange 37 of the turning ring. The oil is generally fed down in the turning head in great volume. Most of it will pass through the central opening. But portions of it will pass to other points, carrying metal particles or other dirt and occasionally clogging the moving parts. By providing at points outside all the central and the movable parts within the head an opening or openings for the passage of the oil and any dirt carried therewith, there will be less chance of such obstructions. The oil in fact will tend to flow through such openings and wash out the cutter-head.

With the arrangement of the parts shown I am able to use the turning ring which can be made with great accuracy and very cheaply. All the inner faces thereof, that is the inner faces which provide bearings for the ring and for the toggles, can be formed by a simple lathe turning operation. The cross-section is uniform throughout the circumferential length of the ring (disregarding any lugs or lug on the outside which do not need to be machined finished).

The same is true of the top plate 22 with its flanges 24. The finished faces where this plate bears against the supporting plate 14 and against the rings 38 and 41, and the under faces of the plate can all be machined by simple lathe operations.

The shape of the chasers, Figs. 9 to 17, is substantially rectangular in cross-section, with a flat back face, as at the left in Fig. 10, which bears continuously from the top to the bottom edge and substantially throughout the length of the chaser against the back wall of the recess formed by the two parts 30 and 31 of the carrier.

Though I have described with great particularity of detail certain embodiments of my invention, yet it is not to be understood therefrom that the invention is restricted to the particular embodiments disclosed. Various modifications thereof in detail and in the arrangement of the parts may be made and the separate features may be used in other combinations by those skilled in the art without departing from the invention as defined in the following claims.

What I claim is:—

1. A machine of the class described including in combination a cutter-head and a support therefor arranged to travel in suitable guides, the cutter-head comprising top and bottom plates, pins fixed to one of said plates and bolts engaging said pins for holding the other plate in place, and additional bolts for attaching the cutter-head to its support.

2. A machine of the class described including in combination a cutter-head and a support therefor arranged to travel in suitable guides, the cutter-head comprising top and bottom plates, pins fixed at their upper ends to the top plate and bolts engaging the lower ends of said pins for holding the bottom plate in place, and additional bolts engaging the upper ends of said pins for attaching the cutter-head to its support.

3. A machine of the class described including in combination a cutter-head and a support therefor arranged to travel in suitable guides, the cutter-head comprising top and bottom plates, pins fixed to one of said plates and serving to space said plates apart, and cutter-carriers between said plates pivoting about said pins, the cutter-head being detachable from its support without disassembling any of said parts.

4. A machine of the class described including in combination a cutter-head and a support therefor arranged to travel in suitable guides, the cutter-head comprising top and bottom plates, pins fixed to one of said plates and serving to space said plates apart, and cutter-carriers between said plates pivoting about said pins, and bolts engaging said pins for attaching the cutter-head to its support.

5. A machine of the class described including in combination a cutter-head, blocks mounted therein for carrying the cutters, a turning ring carried by said cutter-head and operatively connected with said blocks to adjust the cutters inward and outward, and a support for the head adapted to travel in guides, said head being detachable from its support without disassembling any of the parts referred to.

6. A cutter-head for machines of the class described comprising pivoted cutter-carriers, a turning ring, toggle links having removable pivot pins engaging said carriers and operated by said ring, supporting bearings being provided for both ends of the pivot pins in said ring.

7. A cutter-head for machines of the class described comprising pivoted cutter-carriers, a turning ring, toggle links engaging said carriers and operated by said ring and pins for said toggle links passing through holes in said ring adapted to be withdrawn from the outside of said ring.

8. A cutter-head for machines of the class described comprising pivoted cutter-carriers, a turning ring, toggle links engaging said carriers and operated by said ring and pins for said toggle links passing through holes in said ring adapted to be withdrawn from the outside of said ring, said pins having their ends threaded for engagement by a pulling tool to withdraw them.

9. A cutter-head for machines of the class described comprising pivoted cutter-carriers, a turning ring, toggle links engaging said carriers and operated by said ring, each end of each toggle link having a trunnion pin extending therethrough with both its ends projecting beyond the link so as to provide two supporting bearings for the pin.

10. A cutter-carrier for machines of the class described consisting of a block made in separate parts fastened together and forming a recess for receiving the cutter, said parts having ears between which the end of an operating device is connected.

11. A cutter-carrier for machines of the class described consisting of a block made in separate parts fastened together and forming a recess for receiving a cutter, an adjusting screw threaded in one of said parts for engaging a shoulder of the cutter to adjust the same longitudinally, a wedge adapted to engage the face of the cutter and a clamping screw carried by the same part of the block as the adjusting screw and adapted to advance said wedge to clamp the cutter in position.

12. A cutter-carrier for machines of the class described consisting of a block made in two parts, 30 and 31 each formed with a recess to jointly form a seat for the cutter and a clamping wedge, and means for operating said wedge to clamp or release the cutter and means for adjusting the same longitudinally.

13. A machine of the class described including in combination a cutter-head, an operating ring on said cutter-head for adjusting the cutters inward and outward, a spring for turning said ring in one direction and a latch comprising a latching arm 48 with an integral pivot mounted in one of the relatively turning parts and a catch 51 mounted on the other, and a roller 54 by which the ring may be turned toward the latching positon, said catch 51 and roller 54 being mounted on a common lug 52.

14. A cutter-head of the character described comprising cutter-carriers, a turning ring whose cross-sectional contour is substantially uniform throughout its length, said turning ring having an inner annular recess, devices for moving the carriers each having an end located in said annular recess, and pivots for said devices bridging said annular recess.

15. A cutter-head for machines of the class described comprising cutter-carriers and a turning ring, said turning ring overlapping said carriers in a radial direction so as to prevent axial movement of the ring while the carriers are held in place.

16. A cutter-head for machines of the class described comprising cutter-carriers and a bottom plate, said plate having a central opening for the passage of oil and chips and providing an additional opening outside of said central opening.

17. A cutter-head for machines of the class described comprising cutter-carriers and a bottom plate, said plate having a central opening for the passage of oil and chips and providing an additional opening outside of said central opening and beyond said carriers.

18. A machine of the class described comprising uprights, a cutter-head travelling between said uprights and a gib 16 carried by said uprights and provided with a T-slot extending throughout its height for attachment at different points of devices for controlling the cutter-head.

In witness whereof, I have hereunto signed my name.

JAMES A. EDEN, Jr.